United States Patent [19]
Huwe

[11] 3,973,513
[45] Aug. 10, 1976

[54] DROP MARKER

[76] Inventor: Maurice K. Huwe, Box 583, Waitsburg, Wash. 99361

[22] Filed: July 7, 1975

[21] Appl. No.: 593,769

[52] U.S. Cl. .................. 116/124 B; 116/124 R
[51] Int. Cl.² ................................ G08G 5/00
[58] Field of Search ........... 46/38, 1 L; 116/124 B, 116/124 R; 428/28; 340/24; 229/37 E

[56] References Cited
UNITED STATES PATENTS

| | | | |
|---|---|---|---|
| 2,474,523 | 6/1949 | Guyer | 229/37 E |
| 2,589,045 | 3/1952 | Brooks | 229/37 E |
| 3,094,266 | 6/1963 | Hoff | 229/37 E |
| 3,199,764 | 8/1965 | Oliver | 229/37 E |
| 3,280,549 | 10/1966 | Hsu | 116/124 B |
| 3,428,019 | 2/1969 | Tillay | 116/124 B |
| 3,470,846 | 10/1969 | Tillay | 116/124 R |
| 3,885,729 | 5/1975 | Rous | 229/37 E |

Primary Examiner—S. Clement Swisher
Assistant Examiner—Denis E. Corr
Attorney, Agent, or Firm—Thomas W. Secrest

[57] ABSTRACT

This invention is directed to a marker which can be dropped from an airplane so that the pilot of an airplane can see the marker on the ground and know, when he is in the airplane, where the airplane has flown for spraying fertilizer, insecticides, herbicides, and the like. The drop marker comprises a base member of flexible corrugated board and a reinforcing plate attached to the base member. There is also a streamer material which is attached to the base member and which unfolds when the drop marker falls from the airplane toward the ground. The drop marker, upon reaching the ground and with the streamer unfolded, makes it possible for the pilot of the airplane to know where he has sprayed the chemical carried by the airplane.

7 Claims, 6 Drawing Figures

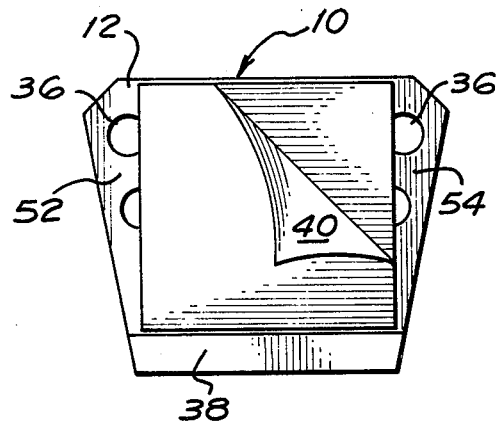
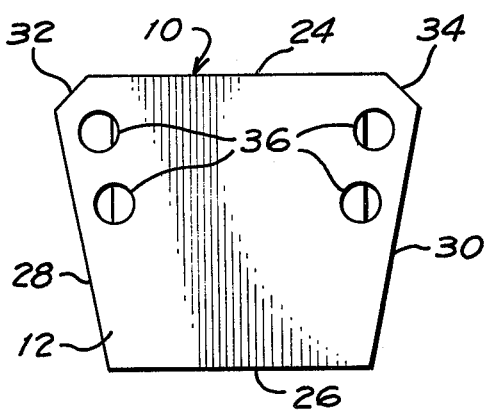
Fig. 1.　　　　Fig. 2.
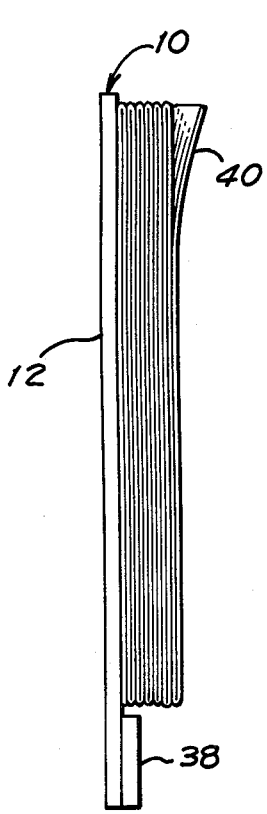
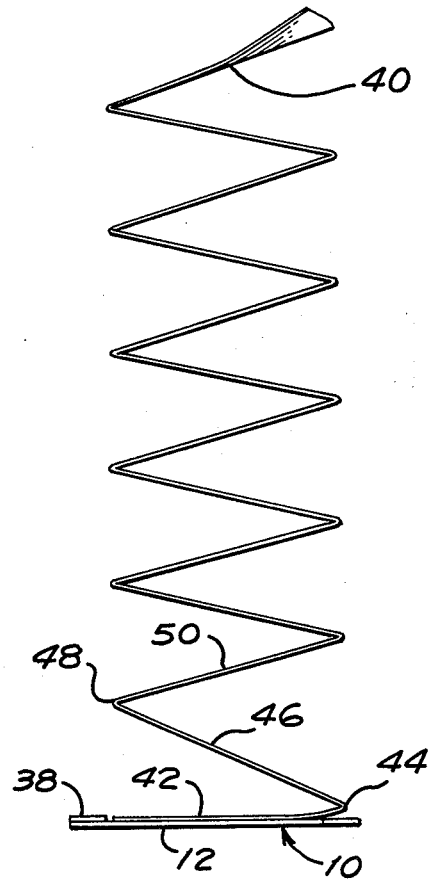
Fig. 3.　　　　Fig. 4.

DROP MARKER

THE BACKGROUND OF THE INVENTION

For a number of years, airplanes have been used for spraying chemicals onto land. For example, airplanes have been used for spraying fertilizer, insecticides, herbicides, and the like on farm land. Also, airplanes have been used for spraying insecticides and herbicides on grazing land and on forest land to control the tussock moth.

With the spraying of these chemicals onto land, it is necessary for the airplane pilot to know where the chemicals have been sprayed and where the chemicals have not been sprayed. To know the demarcation between these two areas, it is necessary to have an indicator. A satisfactory indicator is a drop marker which can be dropped from an airplane and which has an identifying portion or member which can be seen by the pilot in the airplane when the drop marker is on the ground or hanging from a tree in a forested area.

The drop marker should be, relatively, inexpensive—as a large number of drop markers are used by airplane pilots in the spraying of chemicals onto the farm land, range land, and forests.

THE OBJECTS AND THE ADVANTAGES

A primary object of this invention is to provide a drop marker which can be dropped from an airplane and upon landing on the ground or being hung up in a tree can be visually seen by an airplane pilot while flying the airplane; another important object of this invention is to provide such a drop marker which is inexpensive to manufacture and to package for dropping from an airplane; an additional and important object and advantage of this invention is to provide such a drop marker which can be used with the existing ejection equipment on airplanes or which can be used with existing commercial ejection equipment; and, another important object and advantage of this invention is to provide such a drop marker which will disintegrate upon being exposed to the elements such as water, air, sun, wind, and the bacterial action in the earth so that, in effect, the drop marker does not become a pollutant but does disintegrate and can be recycled into the chemical and physical processes of the earth.

These, and other important objects and advantages of the invention, will be more particularly brought forth upon reference to the specific description of the invention, the appended claims, and the accompanying drawings.

| PATENT NUMBER | INVENTOR | ISSUE DATE | TITLE |
|---|---|---|---|
| 1,564,152 | J. M. Thomson | Dec. 1, 1925 | Sample Display Folder |
| 1,798,052 | F Addition | Mar. 24, 1931 | Warning Signal |
| 1,805,002 | F. Neumeyer | May 12, 1931 | Letters, Figures, . . . from Aircraft |
| 1,985,678 | L. T. Hand | Dec. 25, 1934 | Superfold Paper Tape |
| 2,149,530 | L. Loweth | Mar. 7, 1939 | Continuous . . . Record Assembly |
| 2,183,540 | D. H. Campbell et al | Dec. 19, 1939 | Target Towing Device |
| 2,238,875 | F. G. Manson | Apr. 15, 1941 | Aerial Trailer |
| 2,134,987 | N. N. Shorb | Nov. 1, 1938 | Method of Aerial Advertising |
| 2,349,984 | R. K. Ostrander | May 30, 1944 | Toy |
| 2,360,516 | G. T. Schmidling | Oct. 17, 1944 | Phosphorescent Device |
| 2,610,868 | M. Flament | | Expanding folder . . . Manufacturing same |
| 2,825,803 | L. Newbrough | Mar. 4, 1958 | Crash . . . Indicator |
| 2,949,094 | F. H. Clothier | Aug. 16, 1960 | Visual Aircraft Finder |
| 3,059,362 | J. Scherotto | Oct. 23, 1962 | Collapsible . . . Device |
| 3,280,549 | Jui-Cheng Hsu | Oct. 25, 1966 | Release Mechanism . . . Expandable Cartridge |
| 3,428,019 | D. Tillay et al | Feb. 18, 1969 | Drop Marker |
| 3,470,846 | D. Tillay et al | Oct. 7, 1969 | Marking the line of Flight of an Aircraft |

THE GENERAL BACKGROUND OF THE INVENTION

The invention comprises a base member and a streamer or marker which is attached to the base member. The base member is heavier than air. Also, the streamer or marker is heavier than air and unfolds as the drop marker falls from the airplane toward the ground.

Further, the streamer or marker may be heavier than the base member.

With the drop marker lying on the ground and the base member resting on the ground, the streamer is unfolded behind the base member so that the airplane pilot can see the streamer or with the streamer hanging from a tree, it is possible for the airplane pilot to see the streamer and thereby know which areas have been sprayed with the chemical and which areas have not been sprayed with the chemical.

THE DRAWINGS

FIG. 1 is a front elevational view of a specific embodiment of the drop marker and illustrates the base member, the reinforcing plate and the streamer;

FIG. 2 is a rear elevational view of a drop marker and illustrates the base member, a portion of the streamer, and passageways or holes in the base member;

FIG. 3 is a side elevational view of the drop marker and illustrates the base member, the reinforcing plate, and the streamer with the streamer folded back on itself and attached to the base member;

FIG. 4 is a side elevational view of the drop marker and illustrates the base member, the reinforcing plate, and the streamer unfolding so as to illustrate the folds of the streamer as in a pleated manner;

Figure 5:
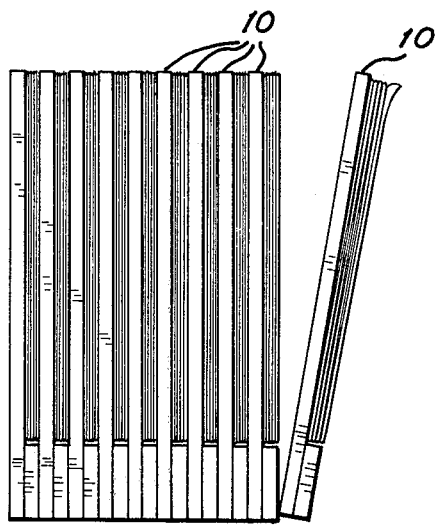
Figure 6:
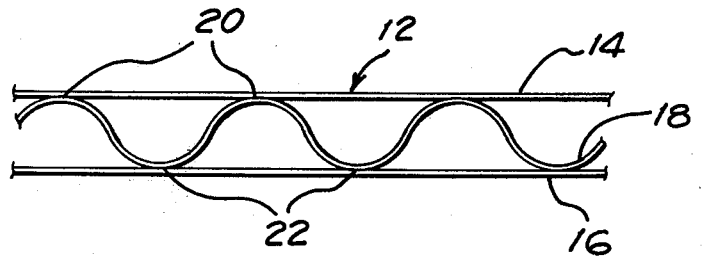

FIG. 5 is an illustration of a number of drop markers in a position, as in a cannister or container for holding the drop markers, and with the right drop marker being in a position to be removed from the main number of drop markers prior to being ejected; and, FIG. 6 is an end view of the base member and illustrates the flexible, corrugated board comprising the base member and a flexible, corrugated board comprises a corrugated sheet, and a first base sheet of one of the corrugated sheets and the second base sheet of the other part of the corrugated sheets.

THE SPECIFIC DESCRIPTION OF THE INVENTION

In the drawings, it is seen that there is a drop marker 10 comprising a base member 12. The base member 12 is of a flexible, corrugated board.

The base member 12 is of flexible, corrugated board which is often used in the manufacture of boxes and containers and comprises a first facing sheet 14, a second facing sheet 16, and a corrugated sheet 18, see FIG. 6. The first facing sheet 14 is glued or adhered to the corrugated sheet 18 at areas 20. Likewise, the second facing sheet 16 is glued to or adhered to the corrugated sheet 18 at areas 22. The result is a flexible, corrugated board which is used as the base member 12 for the drop marker 10.

The base member 12 is of a, generally, trapezoidal configuration, having a long base 24 and a short base 26 connected by sides 28 and 30. The long base 24 and the side 28 are connected by a diagonal 32 and the long base 24 and the side 30 are connected by a diagonal 34.

In the base member 12 and near the sides 28 and 30 are a number of air passageways or holes 36.

In FIG. 1, it is seen that there are juxtapositioned to the short base 26 a reinforcing plate 38. The reinforcing plate 38 may be of the same flexible, corrugated board as the base member 12 and which is illustrated in FIG. 6.

In FIG. 4, there is illustrated an expanded streamer 40 having a first pleat or a base pleat 42 attached to the base member 12. The base pleat 42 is folded at 44 and into a second pleat 46. The second pleat 46 is folded at 48 and into a third pleat 50 which overlies the second pleat 46 and the first pleat 42. The second pleat 46 overlies the first pleat 42. In other words, the streamer 40 is folded back onto itself as illustrated in FIGS. 4, 3, and 5. The length of the streamer will vary, dependent upon the use to which the drop marker is placed. Streamers varying from approximately 10 ft. in length to about 100 ft. in length are contemplated.

In FIG. 5, there is illustrated a pack of drop markers 10 as arranged in a cannister. The right drop marker is somewhat separated from the pack of drop markers. The right drop marker is in a position to be ejected from the cannister on the airplane so that it can be ejected into the air. Such a use results in a saving of time, chemical, and cost in operating the airplane in that an area which has been sprayed with a chemical will not be sprayed twice with the same chemical.

With the drop marker 10 being ejected into the air, the air flows through the passageways 36 so as to move the streamer 40 away from the base member 12 as illustrated in FIG. 4. The air passageways in the base member allow air to flow and contact the streamer to assist in unfolding the streamer while the marker is dropping from an airplane.

In FIG. 1, it is seen that some of the base member 12 is exposed around the streamer 40. For example, to the left of the streamer 40, there is an exposed area 52 and to the right of the streamer 40, there is an exposed area 54. Also, the reinforcing plate 38 may be considered to be an exposed area. The exposed areas 52, 54, and 38 make it possible to discharge the markers properly from the ejecting means on an aircraft. Again, one of the advantages of this drop marker is that it can be used with existing equipment on airplanes for discharging drop markers. Therefore, certain portions of the base member 12 extend beyond the edges of the folded streamer 40, as illustrated in FIG. 1, for exposed areas 52, 54, and 38.

The base member 12 is heavier than air and the streamer 40 is heavier than air. The streamer 40 may be heavier than the base member 12. One of these drop markers 10 was disassembled and the base member 12 with the reinforcing plate 38 was weighed and the weight was, approximately, ½ oz. The streamer 40 was weighed and the weight was, approximately, 1 oz. With the base member 12 being lighter than the streamer 40, there is a saving in weight in the handling and carrying in the airplane of a number of the drop markers 10. In time, the saving in weight amounts to a saving in the operation of the airplane.

The thickness of the base member 12 is in the range of 0.1 to about 0.15 in., and the thickness of the base member 12 and the reinforcing plate 38 is in the range of about 0.2 in. to about 0.3 in.

The base member 12 and the streamer 40 may be made of various materials. It is possible to make the base member 12 and the streamer 40 of plastic or of fibrous material. A desirable fibrous material is cellulose which is, commonly, available. The structure of the base member 12 and the reinforcing plate has been previously described. The streamer 40 may be commercial tissue paper of a quality and thickness similar to facial tissue.

It is desirable that the base member 12, reinforcing plate 38, and streamer 40 disintegrate upon being exposed to the elements, such as water, sunshine, wind, and the action of bacteria in the earth. Therefore, it is desirable that the drop marker 10 be made of cellulose fibers which are, readily, available from wood. The adhesive for bonding together the base sheets 14 and 16 to the corrugated sheet 18, and also for bonding the streamer 40 to the base member 12, may be a urea based adhesive. Such an adhesive also functions as a fertilizer upon the drop marker 10 disintegrating.

From the foregoing, and having presented my invention, what I claim is:

1. A drop marker for use in marking ground areas from an airplane comprising:
   A. a flexible base member,
   B. a streamer strip of soft flexible material having a large surface area, one end of said strip affixed to the base member and the other end of said strip being free,
   C. said folded streamer strip lying wholly within the border of the base member to provide exposed edge portions on said base member and thereby facilitate separation of one member from a stack of markers,
   D. holes within said base member relatively near the edge portions of the base,
   E. a reinforcing plate attached to the base member at an exposed edge portion to stiffen said base member at said portion and to cause an unbalance in the weight distribution of the base; and F. whereby when the marker is dropped from a plane, the unbalance of the base induces a tumbling action on the marker and air passing through the holes contacts the streamer strip and causes it to unfold and stream behind the base member.

2. The drop marker of claim 1 wherein the base member, reinforcing plate and streamer strip are all composed of biodegradeable material.

3. The drop marker of claim 2 wherein the biodegradeable material comprise vegetable fibers.

4. The drop marker of claim 3 wherein the weight of the base member and reinforcing plate is less than the weight of the streamer strip by a substantial fraction.

5. The drop marker of claim 3 wherein the streamer strip in folded condition overlays the holes at least in part.

6. The drop marker of claim 4 wherein the streamer strip in folded condition overlays the holes at least in part.

7. The drop marker of claim 3 wherein the base member is a corrugated board.

* * * * *